United States Patent
Fish

(10) Patent No.: US 11,082,926 B2
(45) Date of Patent: *Aug. 3, 2021

(54) MOBILE TARGET LOCATOR WITH BOTH RF AND CELLULAR COMMUNICATIONS

(71) Applicant: Robert D. Fish, Irvine, CA (US)

(72) Inventor: Robert D. Fish, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/865,650

(22) Filed: May 4, 2020

(65) Prior Publication Data

US 2020/0267656 A1 Aug. 20, 2020

Related U.S. Application Data

(63) Continuation of application No. 16/544,439, filed on Aug. 19, 2019, now Pat. No. 10,667,216.

(60) Provisional application No. 62/765,305, filed on Aug. 20, 2018.

(51) Int. Cl.
    *H04W 52/02* (2009.01)
    *G01S 19/34* (2010.01)
    *H04W 8/24* (2009.01)

(52) U.S. Cl.
    CPC ......... *H04W 52/0235* (2013.01); *G01S 19/34* (2013.01); *H04W 8/24* (2013.01)

(58) Field of Classification Search
    CPC ..... H04W 84/12; H04W 64/00; H04W 4/029; H04W 72/042; H04L 5/0053
    See application file for complete search history.

(56) References Cited

U.S. PATENT DOCUMENTS

| | | | | |
|---|---|---|---|---|
| 5,293,639 | A * | 3/1994 | Wilson | H04W 52/20 455/17 |
| 6,628,928 | B1 * | 9/2003 | Crosby | H04H 60/37 455/150.1 |
| 10,165,490 | B1 * | 12/2018 | Govindassamy | H04W 36/0085 |
| 2009/0077159 | A1 * | 3/2009 | Murakami | H04L 67/2842 709/202 |
| 2012/0050101 | A1 * | 3/2012 | Whiteman | G01S 19/14 342/357.31 |

* cited by examiner

*Primary Examiner* — Jamal Javaid

(74) *Attorney, Agent, or Firm* — Fish IP Law, LLP

(57) ABSTRACT

The present invention herein provides apparatus and method, allowing a user to acquire a target location wherever the target is with a target mobile locator. The target mobile locator includes a RF receiver, a transmitter, a GPS locator and a circuit. After receiving "wake-up" signal from the user, GPS locator and/or transmitter can be activated and the target location is sent back to the user. Prior to receiving the wakeup signal, at least one of the GPS locator and the transmitter are either energy reduced state or off state such that the consumption of the energy is minimized in the locator. Therefore, the locator is active for long periods of time. Optionally, a battery can be recharged using, for example, a solar cell under the sun.

7 Claims, 3 Drawing Sheets

US 11,082,926 B2

MOBILE TARGET LOCATOR WITH BOTH RF AND CELLULAR COMMUNICATIONS

This application is a continuation of and claims priority to U.S. application Ser. No. 16/544,439 filed Aug. 19, 2019, which claims priority to U.S. Provisional Application No. 62/765,305 filed Aug. 20, 2018. This and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

BACKGROUND

The field of the invention is apparatus and methods for obtaining and receiving location of a target.

FIELD OF THE INVENTION

The following description includes information that may be useful in understanding the present invention. It is not an admission that any of the information provided herein is prior art or relevant to the presently claimed invention, or that any publication specifically or implicitly referenced is prior art.

It is known to use a WiFi network to help users to find a target person, pet or other items. Examples include U.S. Pat. No. 8,451,131B2 filed on Jul. 7, 2009 and US patent application US20140085084A1 filed on May 30, 2015. Those systems, however, are problematic for at least two reasons. First, the tracking device always needs to be on, which consume a relatively high amount of energy, which means that the battery or other power supply can rapidly run out. Second, the tracking device will only work when it can communicate through the router of the WiFi. Thus, a tracking device might be set to work in a home where WiFi network is available, but would not work outside of the home.

These and all other publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

An alternative approach in the prior art is to use a two way radio transceiver. That approach is not limited by a local WiFi network, but still covers only a relatively small geographic area (a) because the transmitter of the tracking device is necessarily of low power because of small size, and (b) because of the need to avoid excessive power usage. For example, a typical walkie-talkie radio uses only 0.5 watts, and might only reach a few hundred meters. Even a high power radio employed by police and other first responders typically uses only 5 watts, and can only reach a few kilometers.

Yet another approach in the prior art is to use two way cellular communication. That approach can cover any distance, as long as the tracking device is within working distance of a cell tower. However, in order to maintain tower communication, a cell phone or other cellular equipped device needs to transmit contact information every few seconds. That is completely impractical for a small tracking device having very limited power supply.

Thus, there is still a need for apparatus, systems and methods in which a locator device can utilize a cell phone network to transmit location information, while still having sufficient power to receive operating instructions for long periods of time with limited onboard battery power.

SUMMARY OF THE INVENTION

The inventive subject matter provides apparatus, systems and methods in which a mobile target locator uses a combination of (a) an RF receiver operating outside of cellular protocols, and (b) a GPS locator providing a location information, (c) a cellular transmitter sending the location information to a user, (d) a circuit being capable of communicating with the RF receiver, the cellular transmitter and the GPS locator and storing information obtained from the user.

In preferred embodiments, the target locator receives a wake up signal through the RF receiver, which then triggers activation of (a) a GPS circuit and (b) the cellular transmitter. Prior to activation, one or both of the GPS circuit and the cellular transmitter are held in reduced power states, which can be off states.

The target locator can be powered in any suitable manner, including one or more of a battery and a capacitor. In preferred embodiments a battery charges a capacitor, and the various circuits can be electrically operated by using the battery and capacitor. In especially preferred embodiments the battery is rechargeable, and a solar cell equipped in a device can be used to recharge the battery.

Contemplated RF receivers include those operating on one or more of AM, FM, short wave and microwave frequencies. Alternatively, an RF receiver could operate using a cell phone frequency, without using cell phone protocols.

It is further contemplated that wake up signals or subsequent signals can include instructions on timing of multiple transmissions of the location information, using use of multiple different delays between transmissions.

Various objects, features, aspects and advantages of the inventive subject matter will become more apparent from the following detailed description of preferred embodiments, along with the accompanying drawing figures in which like numerals represent like components.

DETAILED DESCRIPTION

The following discussion provides many example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

Figure 1:
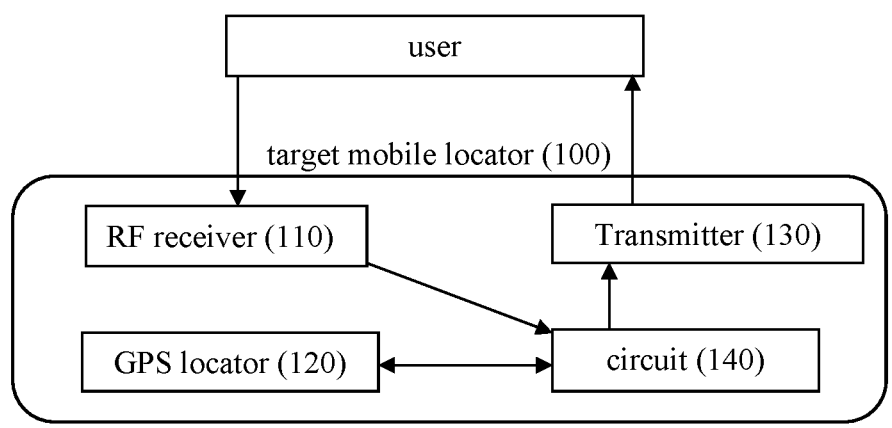
FIG. 1 illustrates method of mobile target locator with both RF and cellular communications.

One should appreciate that the inventive subject matter provides an apparatus and method that allows users to find out location of a target. FIG. 1 generally depicts a target mobile locator 100 that includes a RF receiver, a GPS locator, a transmitter and a circuit, 110, 120, 130 and 140, respectively. A user sends a signal to the RF receiver. Receiving the signal activates the circuit 140. Activating (waking up) the circuit (a transmitter 130 and a GPS locator 120) includes changing the status of the circuit from a reduced to a normal mode electrically or turning on the circuit. On the other hand, inactivating the circuit (a transmitter 130 and a GPS locator 120) includes changing the status from a normal to a reduce mode electrically, or turning off the circuit. The circuit 140 receives the location information from the GPS locator 120 and sends the location information to the transmitter 130. The transmitter 130 then sends the location information to the user. A detailed signal pathway is described in FIG. 2.

Figure 2:
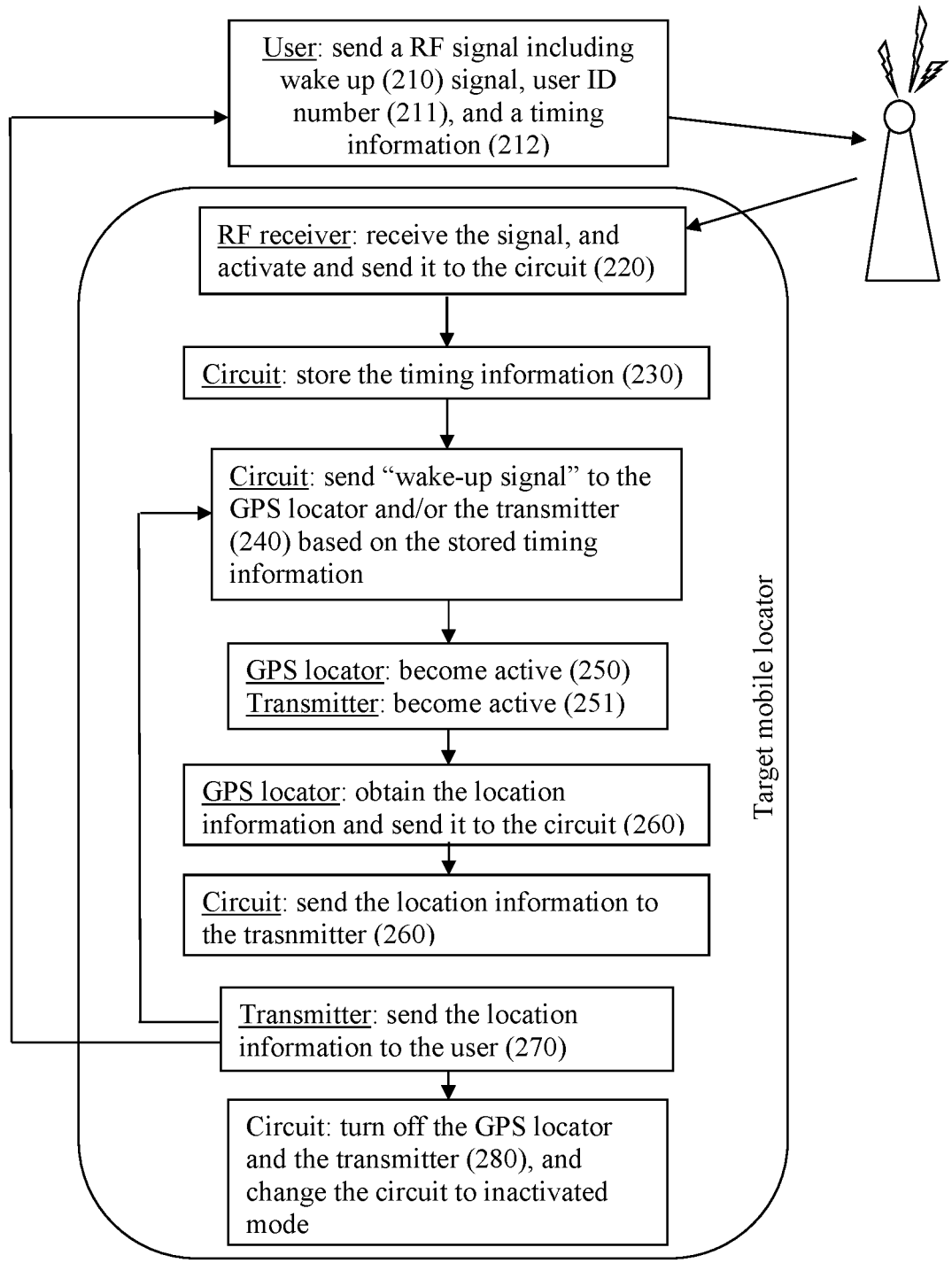
FIG. 2 illustrates a high level schematic of components of a preferred mobile target locator.

FIG. 2 generally depicts signaling pathway 200 inside of the target mobile locator. It is contemplated that the steps depicted in signaling pathway 200 are only one embodiment of the inventive concepts and any steps in signaling pathway 200 can be reordered to cause transmission of location information.

A user sends a RF signal including a wake-up signal (step 210), a user ID number (step 211), and a timing information (step 212) to a RF tower. RF receiver inside of a target mobile locator corresponding to the user ID number receives (step 220) the RF signal and activates a circuit 140 and sends the RF signal (step 210-212) to the circuit. Once the circuit 140 is activated, the circuit 140 is configured to be able to execute one or more functions, including, for example, storing data, transmitting information, and receiving information.

Circuit 140 stores the timing information. Timing information can include any data that enforces circuit 140 to send out signals in a particular manner. For example, timing information can control the frequency, duration, type, and strength of each signal sent out by circuit 140.

Based on the stored timing information, circuit 140 sends out one or more signals to activate the GPS locator (step 250) and/or the cellular transmitter (step 251). It is contemplated that the circuit 140 can send out signals to activate any one or more transmission and/or receiving mediums. For example, circuit 140 can activate one or more transmission and/or receiving mediums including, for example, mediums that transmit and/or receive internet protocol addresses, MAC addresses, RFID signals, GPS signals, and cellular network signals (e.g., 3G, 4G, 4G LTE, etc.).

In the depicted embodiment, circuit 140 activates a GPS locator and a transmitter. In some embodiments, circuit 140 only activates a GPS locator. In preferred embodiments, circuit 140 activates at least a GPS locator and a transmitter.

The GPS locator obtains the location information (step 260) and sends the location information to the circuit (step 270). Location information can comprise any data associated with the geolocation of a target. Location information can be determined using any method knowing in the art, including, for example, time difference of arrival (TDOA), satellite-based global positioning, triangulation of cellular network towers, and radiolocation techniques (e.g., direction finding using a line of bearing.).

Circuit 140 sends the location information to the transmitter, and the transmitter sends the location information to the user (step 270).

If circuit 140 is scheduled to transmit geolocation information at a subsequent time by the stored timing information, then circuit 140 obtains location information at the subsequent time from the GPS locator and uses the transmitter to send the location information to the user.

If circuit 140 is not scheduled to transmit geolocation information at a subsequent time by the stored timing information, then circuit 140 causes target mobile locator to return to a reduced power or power off state, which can later be fully activated by an RF signal or a wake-up signal from the circuit which stores the timing information (step 230).

Prior to receiving the activation signal, the GPS locator and the cellular transmitter are held in reduced power state or power off state, such that the consumption of the energy is minimized and the user can use the locator for a long period of time such as years of operation. In a preferred embodiment, when the location information needs to be obtained more than 10 min later, the GPS locator and the transmitter can be shut off once and turned back on when the timing comes, such that energy consumption is significantly reduced.

The RF signal can contain the timing information 212. The timing information 212 includes timings when the location information is required. Therefore, the user can repeatedly monitor the target location at various timings for examples, 10 seconds, 1 minutes, 10 minutes and 1 hour later after the request of tracking a target.

The RF receiver includes AM, FM, short wave and microwave frequencies. Alternatively, an RF receiver could operate using a cell phone frequency, without using cell phone protocols.

Figure 3:
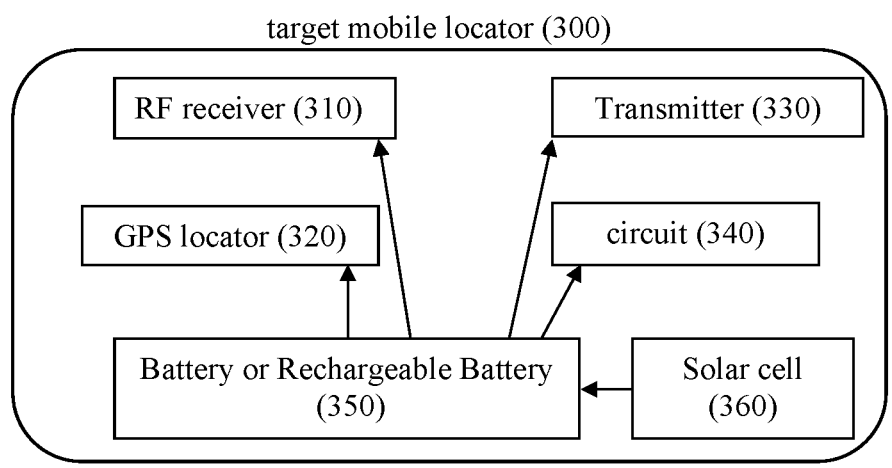
FIG. 3 illustrates an electric schematic of components of a preferred mobile target locator.

The target locator can be powered in any suitable manner, including one or more of a battery and a capacitor. In preferred embodiments a battery charges a capacitor, and the various circuits can be electrically operated by using the battery and capacitor. In especially preferred embodiments the battery is rechargeable 350, and a solar cell 360 is used to recharge the battery, shown in FIG. 3. FIG. 3 illustrates rechargeable battery system installed in the target mobile locator 300 including a rechargeable battery 350 and the solar cell 360. The solar cell convert sunlight or other ambient light to battery power, as a result, the mobile locator can charge its battery, being able to maintain the life of the mobile locator 300 including a RF receiver 310, a GPS locator 320 and a transmitter 330 and a circuit 340.

However, it is also contemplated that any means of charging battery 360 can be employed. For example, battery 310 can be charged by connecting to a wind-based charging medium (e.g., portable wind turbine) and a mechanical charging medium (e.g., a dynamo, hand crank generator, etc.).

In some embodiments, battery 350 is not coupled to a power source configured to recharge the battery. Instead, it is contemplated that battery 350 can power target mobile locator until battery 350 no longer holds a sufficient charge. In these embodiments, it is contemplated that battery 350 can be replaceable. For example, battery 350 can be a button cell battery, a general purpose battery, or any other battery type that is known in the art.

In other embodiments, battery 350 can be coupled to a power conduit to allow recharging of the battery. In one example, battery 350 can be charged through a wired charging cable attached to a power source. In another example, battery 350 can be recharged through a wireless power transmission medium, including, for example, an electromagnetic induction-based wireless charger.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method for a user to obtain a location information from a locator device having a circuit, comprising:
   the user sending an instruction to a radio transmitter to transmit a wake-up signal and a timing information to the locator device;
   the locator device using the wake-up signal to activate the circuit;
   the circuit using the timing information to (i) transition the locator between a reduced power and a full power state, and (ii) activate a cellular transmitter; and
   the locator device using the cellular transmitter to transmit the location information to the user.

2. The method of claim 1, wherein the reduced power state is a power-off state.

3. The method of claim 1, further comprising the circuit using the timing information to activate a GPS circuit that provides the location information.

4. The method of claim 1, wherein the timing information controls a delay between repeated transmissions of the location information by the locator device.

5. The method of claim 4, wherein the timing information is configured to be adjusted as a function of a level of remaining battery power in the locator device.

6. The method of claim 1, wherein the timing information controls the type of signal by the location device.

7. The method of claim 1, wherein the timing information further controls the frequency of signal sent by the location device.

* * * * *

UNITED STATES PATENT AND TRADEMARK OFFICE
CERTIFICATE OF CORRECTION

| | |
|---|---|
| PATENT NO. | : 11,082,926 B2 |
| APPLICATION NO. | : 16/865650 |
| DATED | : August 3, 2021 |
| INVENTOR(S) | : Robert D. Fish |

It is certified that error appears in the above-identified patent and that said Letters Patent is hereby corrected as shown below:

In the Claims

Column 6, Line 34, Claim 6 "signal by the location" should read --signal sent by the location--

Signed and Sealed this
Twenty-sixth Day of July, 2022

*Katherine Kelly Vidal*

Katherine Kelly Vidal
*Director of the United States Patent and Trademark Office*